United States Patent [19]

Fortmann et al.

[11] 4,402,618
[45] Sep. 6, 1983

[54] HIGH SPEED ROTARY MACHINE BEARING MOUNT STRUCTURE

[75] Inventors: William E. Fortmann, West Simsbury; James A. Mrazek, South Glastonbury; Robert Telakowski, Windsor Locks; Robert Sherman, West Hartford, all of Conn.

[73] Assignee: United Technologies Corporation, Hartford, Conn.

[21] Appl. No.: 230,573

[22] Filed: Feb. 2, 1981

[51] Int. Cl.³ ............................................. F16C 32/06
[52] U.S. Cl. .................................. 384/107; 384/119; 384/124
[58] Field of Search .............. 308/9, DIG. 1, 26, 2 A, 308/2 R, 184 A, 184 R; 384/107, 119, 124, 117, 121, 114, 221, 223

[56] References Cited

U.S. PATENT DOCUMENTS

| | | | |
|---|---|---|---|
| 3,003,831 | 12/1956 | King | 308/26 |
| 3,309,153 | 12/1963 | Kelley | 308/36.1 |
| 3,424,503 | 6/1965 | Schulz | 308/26 |
| 3,528,712 | 7/1970 | Vacca | 308/26 |
| 3,904,008 | 9/1975 | Sonnerat | 192/98 |
| 3,910,651 | 10/1975 | Pearce | 308/26 |
| 3,934,956 | 1/1976 | Pitner | 308/174 |
| 3,958,840 | 5/1976 | Hickox et al. | 308/2 A |
| 4,017,128 | 4/1977 | Setele | 308/174 |
| 4,030,282 | 6/1977 | Spies | 57/124 |
| 4,033,647 | 7/1977 | Beavers | 308/26 |
| 4,046,430 | 9/1977 | Buono | 308/26 |
| 4,109,977 | 8/1978 | Staphan | 308/174 |
| 4,208,076 | 6/1980 | Gray et al. | 308/26 |
| 4,286,827 | 9/1981 | Peterson et al. | 308/26 |
| 4,291,925 | 9/1981 | Peterson et al. | 308/2 A |

Primary Examiner—Lenard A. Footland
Attorney, Agent, or Firm—John Swiatocha

[57] ABSTRACT

Journal and/or thrust bearings of a high speed rotary machine are mounted on a portion of the machine stator by mounts which allow limited tracking of pivotal rotor displacements by the bearings to reduce the risk of bearing damage due to nonuniform bearing pressurization from such pivotal shaft displacements. The mounts resist radial and axial shaft displacements for maintenance of sufficient shaft-stator alignment to prevent risk of rotor-stator impact.

6 Claims, 2 Drawing Figures

HIGH SPEED ROTARY MACHINE BEARING MOUNT STRUCTURE

DESCRIPTION

1. Technical Field

This invention relates in general to high speed rotary machinery such as a turbocompressor for an air cycle refrigeration system, and more particularly to rotor bearing mount structure for such high speed rotary machinery.

2. Background Art

In high speed rotary machinery such as a turbocompressor for an air cycle refrigeration system, it has been the practice to employ ball bearings to support the machine's rotor and maintain a proper alignment of the rotor with respect to the machine's stator. It has recently become the practice to employ foil bearings in the capacity of the ball bearings noted herein. Such foil bearings, as the name implies, employ thin leaves or foils therein to establish and maintain a cushion of air or other suitable fluid at the rotating surface of the rotor. An example of a foil journal bearing is found in U.S. Pat. No. 4,133,585 to Lazar Licht, while a teaching of a foil thrust bearing is found in U.S. Pat. No. 4,082,375 to William E. Fortmann.

Foil bearings such as those noted hereinabove are rather delicate and are susceptible to damage under conditions of misalignment of the rotor with the machine stator due to whirl instabilities resulting from imbalance in machine structure or loading. Of even greater risk to the integrity of the foil bearings is the risk imposed by misalignment of the rotor with the stator due to gyroscopic effects, as were the machine operates within an environment such as an aircraft. In either case, misalignments of the rotor with the stator can cause severe deviations from uniform bearing loading thereby resulting in substantial damage to the bearing and potentially greater damage to the machine's rotor or stator due to impact therebetween upon such bearing failure.

Accordingly, it is seen that accommodation of some rotor misalignment with respect to the bearings and stator would be desirable to prevent damage to those components.

DISCLOSURE OF INVENTION

It is therefore, a principal object of the present invention to provide an improved fluid bearing support structure for high speed rotor machinery, which support structure allows limited tracking by the fluid bearing of angular displacements of the machine's rotor.

It is another object of the present invention to provide a mounting structure for fluid bearings in high speed rotary machinery which structure prevents accommodation of excessive radial rotor displacements.

It is another object of the present invention to provide such a mounting structure prevents the accommodation of excessive rotor axial displacements.

In accordance with the present invention, a high speed rotary machine such as a turbocompressor for an air cycle refrigeration system is provided with journal bearings which support and maintain the alignment of the rotor with the stator, the journal bearings being mounted within the stator such that angular displacements of the rotor are accommodated by limited pivotal displacement of the journal bearing with little or no corresponding radial bearing displacement. The machine may also include a thrust bearing mounted such that the thrust bearing tracks the rotor to accommodate pivotal movement thereof, yet resists axial rotor movement which would otherwise further risk impact between the rotor and stator.

In the preferred embodiment, such rotor displacement accommodation and resistance is achieved by bearing mounts each comprising a pair of concentric elastomeric members disposed on opposite faces of a rigid member forming an annular shaped mount fixed on the outside thereof to suitable stationary support structure within the machine stator, the inside thereof being fixed to a shell or retainer for the bearing. Such annular mounts flex in shear (parallel to the inner and outer major faces thereof) and are oriented such that limited pivotal bearing movement, tracking angular rotor displacement effects such shear flexure. However, the elastomeric members are disposed with respect to the rotor such that axial loading in the case of the thrust bearing and radial loading in the case of the journal bearing result in little or insignificant amounts of compression thereby substantially resisting radial and axial shaft displacements.

The foregoing, and other features and advantages of the present invention, will become more apparent from the following description taken in connection with the accompanying drawing.

BEST MODE FOR CARRYING OUT THE INVENTION

Figure 1:
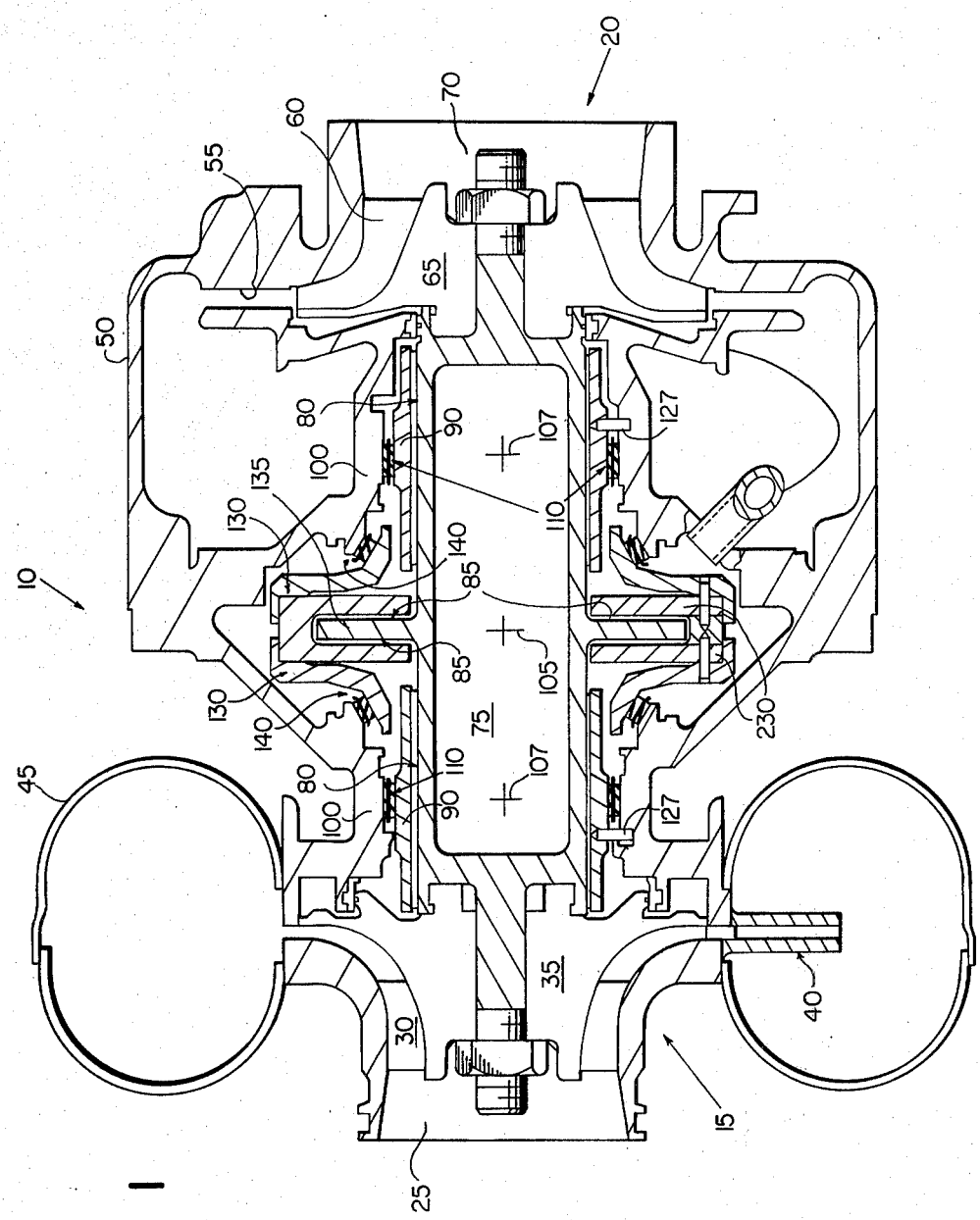
FIG. 1 is a sectioned elevation of a high speed rotary machine employing the bearing mount structure of the present invention.
Figure 2:
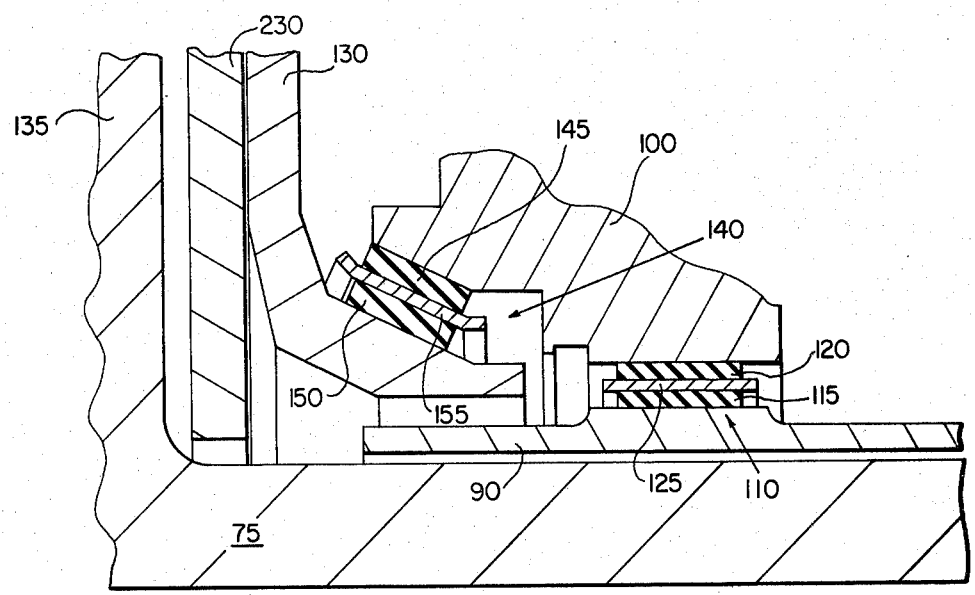
FIG. 2 is an enlarged fragmentary view of a portion of the structure shown in FIG. 1 and illustrating the bearing mount structure of the present invention.

Referring to the drawings, a high speed rotary machine employing the bearing mount structure of the present invention is illustrated. For purposes of illustration, the machine comprises a turbocompressor such as would be employed in an air cycle refrigeration machine for pressurizing and cooling the cabin of an aircraft. However, it will be understood that the bearing mount structure of the present invention is not limited to this application, the structure being suitable for use in any rotating machinery employing fluid journal and/or thrust bearings.

The turbocompressor is shown generally at 10, comprising a compressor section 15 and a turbine section 20. The compressor section includes an inlet 25 through which air is drawn and then pressurized by the interaction by blades 30 mounted on hub 35 with diffuser 40. The pressurized air is discharged to header 45 being supplied therefrom to various other auxiliary fluid handling components of the air cycle machine. Subsequent to passing through such auxiliary equipment, the air is returned to the turbomachine through turbine header 50, and inlet nozzles 55, doing work on blades 60 mounted on hub 65 whereby the air is expanded and cooled and subsequently discharged through outlet 70. It is seen from FIG. 1 that both the compressor and turbine hubs and blades are mounted on a common shaft 75.

Shaft 75 is supported and maintained in alignment with the machine's stator by a pair of fluid journal bearings 80 and a pair of fluid thrust bearings 85. In the drawings, these bearings are shown merely as voids which accommodate a cushion of fluid such as air. However, it will be understood that the bearings may be of the foil bearing variety such as those shown in the Fortmann and Licht patents noted hereinabove. For clarity, the structural details of these foil bearings are not illustrated.

Referring first to journal bearings 80, each bearing includes a retainer or shell 90 which supports the bearing's foil members, or if no such foils are involved, defines the radially outward boundary of the bearing's fluid cushion. In the preferred embodiment, the shells are substantially cylindrical, being disposed concentrically about shaft 75 and mounted on stationary supports 100 therefor, which comprise part of the machine's stator. As set forth hereinabove, imbalances in such high speed machinery often result in whirl instability of the machine's rotor, that is, an angular displacement of the rotor generally about central transverse axis 105. As futher indicated hereinabove, gyroscopic precession of the machine's rotor caused by pivotal movement of an aircraft fuselage in which the machine is employed may result in even greater pivotal or angular displacements of shaft 75 about central transverse axis 105.

To prevent damage to the bearings, the shells are mounted for pivotal or limited rotational movement about transverse axes 107 generally central to the journal retainers. This "tracking" of the shaft by the journal retainers is achieved by mounts 110. The mounts comprise first and second thin concentric annuli 115 and 120 formed from a resilient or elastomeric material. Annuli 115 and 120 are fixed, at opposed major surfaces thereof to opposite sides of a rigid annulus 125 formed from any non-elastic material of suitable strength and bonding compatibility with the elastomeric annuli. Any greater or lesser number of elastic and nonelastic annuli may be employed as is appropriate. In the preferred embodiment, annuli 115 and 120 are formed from silicon rubber and rigid annulus 125 is formed from stainless steel. The inner surface of annulus 115 is fixed to shell 90 by any suitable bonding techniques and the outer surface of annulus 120 is fixed to stationary support portion 100 by a suitable bonding technique whereby the shell is suspended on the mount interiorly of support portion 100.

A pivotal or angular displacement of shaft 75 will initially alter the pressurization of the bearing retainer or shell 90. With regard to the right-hand shell or retainer, it will be seen that a counterclockwise pivoting of the shaft 75 about central transverse axis 105 decreases the spacing between the shaft and the retainer at the right-hand end of the upper portion of the retainer and increases the spacing between the shaft and the right-hand end of the lower retainer portion. Likewise, at the left-hand end of the retainer, the spacing between the shaft and the retainer is decreased at the lower portion thereof and increased at the upper portion thereof. The reduction in spacing between the shaft and the retainer increases the pressurization between those members at the location of such spacing reduction thereby applying a moment to the retainer which tends to rotate the retainer in a limited manner about transverse axis 107. This rotation is accommodated by mounts 110 which flex when loaded in shear due to such pivoting or rotation of the retainer. However, the mount tends to be generally incompressible. thereby resisting any radial loading thereof due to angular displacements of the shaft for preservation of radial shaft-stator alignment, thereby limiting the risk of impact of the turbine and compressor rotor blades with the associated stator vanes.

Pins 127, fixed to support portion 100 extend into bored portions of the walls of the retainers, the pins limiting the pivotal displacement of the retainers should mounts 110 fail. A suitable clearance between each pin and the retainer wall accommodate the limited tracking of the rotor by the retainer discussed hereinabove.

With regard to thrust bearings 85, such thrust bearings comprise a retainer 130 which supports bearing mounts 230 disposed adjacent to rotary member 135 fixed to or integral with shaft 75. If the bearing is of the foil variety, the foils are supported in the gap between member 135 and mount 230 mounted on stator portion 100 by mounts 140. Mounts 140 comprise concentric annular members 145 and 150 of elastomeric material. These elastomeric annuli have generally parallel opposed major surfaces fixed to opposite sides of a rigid annulus 155, the remaining major surfaces of annuli 145 and 150 being attached to retainer 130 and support 100 by any suitable bonding techniques. Like annuli 115 and 120, elastomeric annuli 145 and 150 are formed from an elastomer such as silicon rubber. Like rigid annulus 125, annulus 155 may be formed from stainless steel or other suitable nonelastic material. As shown, retainer 130 is fixed to support portion 100 by a pair of the hereinabove described mounts, each of the mounts being disposed on an opposite side of the retainer from the other. The elastomeric and rigid members are generally of hollow, truncated conical shape whereby the mounts themselves are of a truncated conical shape such that the major surfaces of the annuli are disposed generally parallel to the direction of pivoting of that portion of the retainer to which the mounts are fixed.

It will be understood that angular displacement or pivoting of shaft 75 about central transverse axis 105 will cause an imbalance in the pressurization of the thrust bearing fluid. To prevent such altered pressurization from damaging the bearing foils, the thrust bearing mounts 140, like mounts 90 respond to shear loading thereof by flexure parallel to the direction of the major surfaces of the annuli. This allows limited pivotal tracking of the shaft and rotatable member 135 by retainer 130 for maintenance of uniform bearing loading and reduction of risk of bearing damage. It will be appreciated that like mounts 90, mounts 140 are generally incompressible, thereby resisting axial shaft-stator relative movements. Furthermore, the truncated conical shape of the mounts defines an angular offset between the major surfaces of the mounts and the longitudinal axis of the shaft. It will be appreciated that axial thrust of shaft 75 will result in increased axial loading of retainer 130. However, the angular offset of the mount with respect to the longitudinal axis of the shaft results in the component of axial thrust on the retainer normal to the major surfaces of the mount to be effectively resisted by the mount. Only that component of thrust on the retainer parallel to the major surfaces of the mount will result in flexure in the mount thereby permitting the retainer 130 to pivot about axis 105 and track the shaft 75 as it pivots.

Thus, it will be seen that the journal and thrust bearing mount structure of the present invention allow limited accommodation of rotor angular displacement, thereby reducing the risk of bearing damage due to nonuniform bearing pressurization resulting from such shaft displacement. However, in resisting shaft radial displacement and axial displacement, the bearing mount structure of the present invention preserves, to a necessary extent, shaftstator spacing for reducing the risk of impact between the rotors and stator.

Although this invention has been shown and described with respect to detailed embodiments thereof, it will be understood that various modifications in form and detail will suggest themselves to those skilled in the art, and it is intended by the appended claims to cover such modifications as come within the true spirit and scope of this invention.

We claim:

1. A high speed rotary machine including a stator, a rotor comprising a rotatable shaft supported interiorly of said stator on at least one fluid journal bearing, said rotary machine being characterized by said fluid journal bearing comprising a first retainer disposed concentrically outwardly of said shaft, and a mount attaching said retainer to a stationary support therefor in such manner that said retainer is pivotable about a central transverse axis thereof and restrained from rectilinear, radially outward movement, allowing said bearings to track limited, pivotal excursions of said shaft about a central, transverse axis thereof, thereby minimizing nonuniform pressure distribution within said bearing while limiting risk of contact between said stator and rotor due to outward radial movement of said rotor said rotary machine being further characterized by at least one fluid thrust bearing for limiting axial movement of said shaft, said thrust bearing including a retainer disposed proximal to a rotary member fixed to said shaft, said shaft being restrained in an axial direction by a film of pressurized fluid maintained between said retainer and rotary member, said retainer being fixed to a stationary support by at least one mount therefor in such manner that said retainer is pivotable about an axis transverse to the longitudinal axis of said shaft and resists rectilinear, axial shaft movement, while allowing said thrust bearings to track limited pivotal excursions of said shaft about said tranverse axis for minimization of nonuniform pressure distribution in said thrust bearing and risk of contact between said stator and rotor.

2. The high speed rotary machine of claim 1 wherein said thrust bearing retainer is resiliently pivotable about said transverse axis.

3. The high speed rotary machine of claim 2 wherein said thrust bearing mount comprises alternate elastomeric and nonelastomeric members having generally parallel opposed major surfaces, said thrust bearing mount being generally incompressible while responding by generally linear flexure to shear loading thereof from said retainer tracking of pivotal shaft excursions.

4. The high speed rotary machine of claim 3 wherein said alternate elastomeric and nonelastomeric rigid members comprise generally concentric annuli, an outer one of said elastomeric annuli being attached about the periphery thereof to said support and an inner one of said elastomeric annuli being attached about the inner surface thereof to said retainer and wherein said nonelastomeric member comprises an annulus disposed between said elastomeric annuli.

5. The high speed rotary machine of claim 4 wherein said retainer is fixed to said stationary support by a pair of said thrust bearing mounts, each of said mounts being disposed on an opposite side of said rotary member from the other, said elastomeric and rigid members being of generally truncated, conical shape, whereby the major surfaces of said elastomeric and rigid members are generally parallel to the direction of pivoting of that portion of said retainer to which said mounts are fixed.

6. The high speed rotary machine of claim 4 wherein the major surfaces of said elastomeric and rigid members are generally angularly offset from the longitudinal axis of said rotor.

* * * * *